(12) United States Patent
Kawashima et al.

(10) Patent No.: US 10,197,293 B2
(45) Date of Patent: Feb. 5, 2019

(54) SCALE TRAPPING UNIT AND WATER HEATER

(71) Applicant: MITSUBISHI ELECTRIC CORPORATION, Chiyoda-ku (JP)

(72) Inventors: Aya Kawashima, Chiyoda-ku (JP); Seiji Noda, Chiyoda-ku (JP); Shigeru Iijima, Chiyoda-ku (JP); Seiji Furukawa, Chiyoda-ku (JP); Kazuhiro Miya, Chiyoda-ku (JP); Kazutaka Suzuki, Chiyoda-ku (JP); Hirokazu Minamisako, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 122 days.

(21) Appl. No.: 15/122,834

(22) PCT Filed: Aug. 29, 2014

(86) PCT No.: PCT/JP2014/072826
§ 371 (c)(1),
(2) Date: Aug. 31, 2016

(87) PCT Pub. No.: WO2015/132984
PCT Pub. Date: Sep. 11, 2015

(65) Prior Publication Data
US 2017/0067654 A1 Mar. 9, 2017

(30) Foreign Application Priority Data
Mar. 3, 2014 (JP) .................... 2014-040314

(51) Int. Cl.
| | | |
|---|---|---|
| *C02F 5/00* | (2006.01) | |
| *F24D 19/00* | (2006.01) | |
| *F24D 17/02* | (2006.01) | |
| *C02F 1/02* | (2006.01) | |
| *C02F 1/28* | (2006.01) | |
| *C02F 1/52* | (2006.01) | |

(52) U.S. Cl.
CPC ............ *F24D 19/0092* (2013.01); *C02F 1/02* (2013.01); *C02F 1/28* (2013.01); *C02F 5/00* (2013.01);
(Continued)

(58) Field of Classification Search
None
See application file for complete search history.

(56) References Cited

U.S. PATENT DOCUMENTS 5,098,690 A * 3/1992 Koves .................... B01J 8/0278
239/533.1

FOREIGN PATENT DOCUMENTS

| | | |
|---|---|---|
| JP | 50-44758 | 5/1975 |
| JP | 50-44758 U1 | 5/1975 |

(Continued)

OTHER PUBLICATIONS

Office Action dated Jun. 6, 2017 in Japanese Patent Application No. 2016-506071 (with English-language translation).

(Continued)

*Primary Examiner* — Chester T Barry
(74) *Attorney, Agent, or Firm* — Oblon, McClelland, Maier & Neustadt, L.L.P.

(57) ABSTRACT

A scale trapping unit includes a casing having a water inlet and a water outlet at respective ends, and a scale adsorbing element loaded in the casing, the scale adsorbing element having opening ports, each of the opening ports having a representative length greater than a length of a scale particle. The casing has a void region at least at the end where the water inlet is located. A scale trapping unit inlet pipe is perpendicularly connected to a central portion of a bottom surface at the end of the casing where the water inlet is located. The scale trapping unit inlet pipe, the void region, (Continued)

and the scale adsorbing element are linearly aligned so that water flows therethrough in a constant direction.

10 Claims, 14 Drawing Sheets

(52) U.S. Cl.
CPC ...... *F24D 17/02* (2013.01); *C02F 2001/5218* (2013.01)

(56) References Cited

FOREIGN PATENT DOCUMENTS

| | | |
|---|---|---|
| JP | 3-170747 A | 7/1991 |
| JP | 8-505809 A | 6/1996 |
| JP | 11-42477 A | 2/1999 |
| JP | 2014-9917 A | 1/2014 |
| WO | 2012/176325 A1 | 12/2012 |
| WO | 2013/094410 A1 | 6/2013 |

OTHER PUBLICATIONS

International Search Report dated Nov. 11, 2014 in PCT/JP2014/072826 Filed Aug. 29, 2014.
Extended European Search Report dated Jul. 5, 2017 in Patent Application No. 14884505.0.
Japanese Office Action dated Aug. 8, 2017 in Japanese Patent Application No. 2016-506071 (with English translation).

\* cited by examiner 8
(8a)   5

SCALE TRAPPING UNIT AND WATER HEATER

TECHNICAL FIELD

The present invention relates to a scale trapping unit for trapping scale particles and a water heater in which the scale trapping unit is used to inhibit scale particle deposition in a heat exchanger.

BACKGROUND ART

Water heaters for supplying hot water to a bathroom, kitchen, or another place can generally be categorized into types such as electric water heaters, gas water heaters, and oil-fired water heaters, all of which include a part called a heat exchanger to transfer heat to water. Among these water heaters, electric water heaters of the heat pump heat exchanger type (heat pump water heater) in particular have recently been of interest from the standpoint of carbon dioxide reduction as measures for energy conservation and against global warming.

The principle of a heat pump water heater is that atmospheric heat is transferred to a heat medium and water is boiled with the heat. Specifically, the principle is based on the repetition (cooling energy cycle) in which high temperature heat generated by compressing a gas is transferred to water via a heat exchanger and, using the chill generated by expanding the gas, the temperature of the heat medium is returned to atmospheric temperature. Theoretically, heat energy greater than the input energy cannot be extracted, but with a heat pump water heater, which is configured to utilize atmospheric heat, it is possible to use heat energy greater than the energy required for operation.

A very important issue for the heat exchanger in a heat pump water heater is to keep the heat transfer surface clean consistently to transfer heat to water. Contamination on the wall surface of the heat transfer surface reduces the effective heat transfer surface area, resulting in decreased heat transfer performance. Further, accumulation of contaminants increases pressure drop that occurs with the water flow into the heat exchanger, and in the worst case, can cause flow path blockage. One problem encountered particularly in districts where a concentration of hardness components in water (such as calcium ions, magnesium ions, ionic silica, and molecular silica) is high is that a less soluble inorganic compound salt called scales (scale particles) precipitates as a result of heating and deposits in the heat exchanger.

One mechanism by which hardness components in water deposit as scales on the inside of a heat exchanger is that nuclei of calcium carbonates are formed on the high temperature surface such as the heat transfer surface of the heat exchanger and crystal growth of scales progresses. Also, in the case where the water in the tank of a water heater is heated while the water is circulated through the heat exchanger by a pump, the nuclei or particles of calcium carbonates formed in the hot water heated by the heat exchanger may be reintroduced to the heat exchanger and deposit on the heat transfer surface.

Patent Literature 1 discloses a method for separating scale particles as described above from water. This method for preventing scale deposition onto a heat exchanger is that heated water heated by a heat exchanger device is caused to pass through a scale trapping unit that incorporates a scale adsorbing element having a function of adsorbing scales. Patent Literature 1 also discloses a technique of renewing the adsorbing function of the adsorbing element by introducing tap water into the scale trapping unit as rinse water during a time period in which heating is not performed to remove scales from the scale adsorbing element and discharge the scales to the outside of the water circuit.

Patent Literature 2 discloses a method for preventing scale deposition onto a heat exchanger. The method is that an electrode-type scale component precipitation device having a potential difference of at least 2 V is connected between pipes at the water inlet side, and a scale component trapping unit is provided downstream of the scale component precipitation device, the scale component trapping unit designed to trap scales precipitated in the electrode-type scale component precipitation device.

CITATION LIST

Patent Literature

Patent Literature 1: WO 2012/176325
Patent Literature 2: Japanese Unexamined Patent Application Publication No. 3-170747

SUMMARY OF INVENTION

Technical Problem

However, when a scale trapping unit such as the one disclosed in Patent Literature 1 is used, trapped scale particles accumulate in an upstream portion of the scale trapping unit, pressure drop increases in the water circuit, and the scale trapping unit is gradually blocked. Patent Literature 1 also discloses a method for removing scales from the scale adsorbing element of the scale trapping unit by cleaning to discharge the scales to the outside of the water circuit, but the cleaning step requires large amounts of tap water, and, when the discharged water is used for feed water, removed scales may be included in the feed water and can lead to complaints.

The technique disclosed in Patent Literature 2 uses a detachable filter for the scale trapping unit and traps scale components precipitated by means of physical screening. However, when such a method is used to inhibit scale deposition in a heat exchanger, the filter becomes clogged with the trapped scale components in a short time. Further, unless the filter is replaced periodically, the flow path of the scale component removing device becomes blocked.

The present invention has been made in view of the above circumstances, and accordingly, a first object of the invention is to provide a scale trapping unit capable of inhibiting pressure drop increase due to scale particle deposit in an upstream portion of the scale trapping unit and also removing scales formed in water efficiently for an extended period of time without the need for cleaning or replacement. A second object is to provide a water heater including the scale trapping unit.

Solution to Problem

A scale trapping unit according to the present invention includes a casing having a water inlet and a water outlet at respective ends, and a scale adsorbing element loaded in the casing, the scale adsorbing element having opening ports, each of the opening ports having a representative length greater than a length of a scale particle. The casing has a void region at least at the end where the water inlet is located, a water inlet pipe is perpendicularly connected to a central portion of a bottom surface at the end of the casing where the water inlet is located. The water inlet pipe, the void region, and the scale adsorbing element are linearly aligned so that water flows therethrough in a constant direction.

A water heater according to the present invention includes a hot water storage tank, and a heat exchanger heating water to be stored in the hot water storage tank. The hot water storage tank and the heat exchanger are connected to each other by pipes to form a hot water circulation circuit. The scale trapping unit according to the present invention is provided at at least one location in the hot water circulation circuit.

Advantageous Effects of Invention

The present invention provides the scale trapping unit capable of inhibiting pressure drop increase and blockage due to scale deposit at an upstream portion of the scale trapping unit while maintaining high scale trapping performance. In addition, the present invention provides the water heater capable of operating with high performance for an extended period of time without maintenance by employing the scale trapping unit for the water heater.

DESCRIPTION OF EMBODIMENTS

Figure 1:
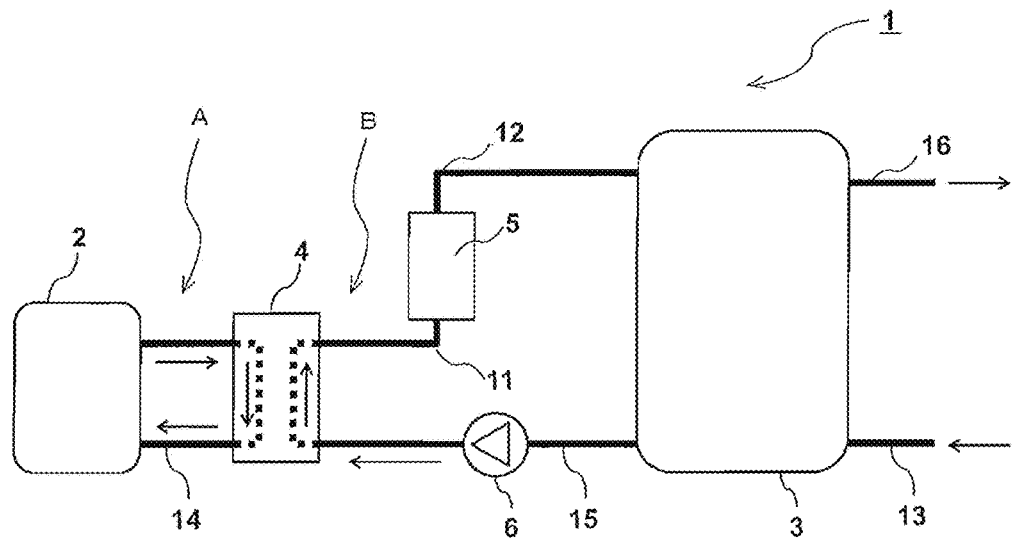
FIG. 1 is a schematic diagram illustrating a water heater according to Embodiment 1 of the present invention.

Embodiments of the scale trapping unit and the water heater according to the present invention will be described hereinafter in detail with reference to the drawings. The present invention is not limited to the following description, and appropriate alterations may be made therein without departing from the scope of the present invention. In the drawings shown below, parts may not be to scale for ease of understanding. The same reference signs will be used throughout the drawings to refer to same or similar parts, and detailed description thereof will be omitted.

Embodiment 1

FIG. 1 is a schematic diagram illustrating a water heater according to Embodiment 1 of the present invention. Firstly, the configuration of a water heater 1 shown in FIG. 1 is briefly described. As shown in FIG. 1, the water heater 1 generally includes a heat source 2 that generates heat for heating water, a heat exchanger 4 that heats water by exchanging heat between the heat generated in the heat source 2 and water, a hot water storage tank 3 that stores water heated in the heat exchanger 4 (hereinafter, heated water is also referred to as hot water), and a scale trapping unit 5 that traps scales (scale particles) from water flowing through the heat exchanger 4.

In the water heater 1, two circuits (heat medium circulation circuit A and hot water circulation circuit B) are provided. The heat medium circulation circuit A is formed by the heat source 2 and the heat exchanger 4 that are connected to each other by a circulation pipe 14, and supplies heat generated in the heat source 2 to the heat exchanger 4 via a heat medium that circulates through the heat medium circulation circuit A. The heat medium circulation circuit A according to Embodiment 1 is of the heat pump type. Specifically, in the heat source 2 includes a compressor, a pressure reducing device, and an evaporator that are constituent elements of the heat pump cycle. The heat exchanger 4 is used as a condenser.

The hot water circulation circuit B is formed by the hot water storage tank 3 and the heat exchanger 4 that are connected to each other by pipes. Specifically, a heat exchanger inlet pipe 15 serving as a feed pipe connects, for example, a lower portion of the hot water storage tank 3 to a water inlet of the heat exchanger 4. A circulation pump 6 circulating water in the hot water storage tank 3 through the hot water circulation circuit B is provided at the heat exchanger inlet pipe 15. Return pipes connect a water outlet of the heat exchanger 4 to, for example, an upper portion of the hot water storage tank 3. That is, the configuration is that the water stored in the hot water storage tank 3 flows through the heat exchanger inlet pipe 15 into the heat exchanger 4 to be heated in the heat exchanger 4 by the heat supplied from the heat source 2, and then returns to the hot water storage tank 3. In Embodiment 1, the scale trapping unit 5 is provided at the return pipes. In Embodiment 1, of the return pipes, the pipe connected to an upstream portion of the scale trapping unit 5 is referred to as a scale trapping unit inlet pipe 11. Of the return pipes, the pipe connected to a downstream portion of the scale trapping unit 5 is referred to as a scale trapping unit outlet pipe 12. Also, a water supply pipe 13 that introduces tap water into the hot water storage tank 3 and a hot water supply pipe 16 that guides the hot water in the hot water storage tank 3 to the hot water destination are connected to the hot water storage tank 3.

The heat source 2 may not necessarily be a heat pump circulation circuit such as the heat medium circulation circuit A, but any medium may be employed as long as a medium can heat the circulating hot water. For example, those skilled in the art will conceive of application to a different type of electric water heater, a gas water heater, an oil-fired water heater, or another type of water heater. The location at which the scale trapping unit 5 (scale adsorbing element 8) is to be connected is most preferably between the heat exchanger 4 and the hot water storage tank 3 as shown in FIG. 1, but not limited to this location. The location where the scale trapping unit 5 is to be installed in the hot water circulation circuit B may be any location as long as it is provided in the hot water circulation circuit B. For example, the scale trapping unit 5 may be provided at the heat exchanger inlet pipe 15, at the heat exchanger 4 (water inlet, water outlet, or another position), or at the hot water storage tank 3 (such as connecting portion to the scale trapping unit outlet pipe 12 and connecting portion to the heat exchanger inlet pipe 15).

Figure 2:
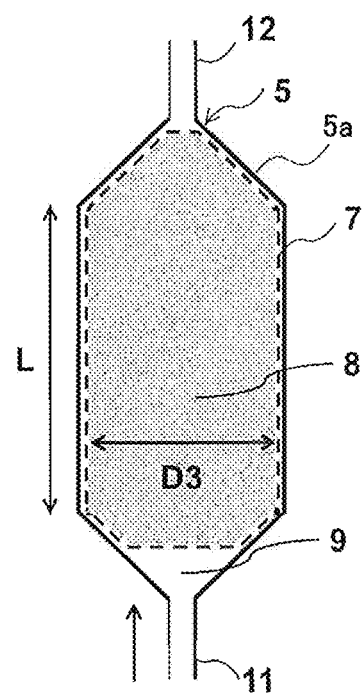
FIG. 2 is a cross-sectional view illustrating a configuration of a scale trapping unit of the water heater according to Embodiment 1 of the present invention.

FIG. 2 is a cross-sectional view illustrating a configuration of the scale trapping unit 5 of the water heater according to Embodiment 1 of the present invention. As shown in FIG. 2, the scale trapping unit 5 includes a casing 5a having a water inlet and a water outlet opened at respective ends (in other words, having pipe connecting portions at respective ends), and a scale adsorbing element 8 loaded in the casing 5a. More specifically, the scale trapping unit 5 has an inlet opened at a central portion of the bottom surface at one end, the inlet being oriented perpendicular to the bottom surface, and an outlet opened at the other end. The casing 5a of the scale trapping unit 5 shown in FIG. 2 has a water inlet in a central portion of the bottom surface at the lower end and a water outlet at the upper end. Further, in Embodiment 1, to prevent the scale adsorbing element 8 from flowing out of the casing 5a, the scale adsorbing element 8 is loaded in a scale adsorbing element container 7, and the scale adsorbing element container 7 is accommodated in the casing 5a. The scale adsorbing element container 7, at least at the two ends (portions each facing the respective openings of the casing 5a and serving as the water inlet or outlet), has a shape having opening ports such as the mesh shape. The opening ports are shaped to be sufficiently larger than scale particles. When the opening ports are small, the scale adsorbing element container 7 itself serve as a filter, so that the opening portions of the scale adsorbing element container 7 can become clogged with scale particles, which can result in blockage of the scale trapping unit 5.

Furthermore, in the casing 5a of the scale trapping unit 5 according to Embodiment 1, a void region 9 is formed at the end where the water inlet is located, and the scale trapping unit inlet pipe 11, the void region 9, and the scale adsorbing element 8 are linearly aligned. Specifically, the casing 5a of the scale trapping unit 5 is configured so that the scale trapping unit inlet pipe 11 is connected to the central portion of the bottom surface at the end where the water inlet is located, in a direction perpendicular to the bottom surface, and the scale trapping unit outlet pipe 12 is connected to the end where the water outlet is located. The void region 9 is located at the end where the scale trapping unit inlet pipe 11 is connected. The void region 9 is a region in which the loaded aggregate scale adsorbing element 8 is absent and into which water freely flows. This configuration allows water to flow through the scale trapping unit inlet pipe 11, void region 9, and scale adsorbing element 8 in order in a constant direction.

The shape of the scale trapping unit 5 may not necessarily be similar to the one shown in FIG. 2, but may be of any shape as long as the scale adsorbing element 8 can be loaded therein. However, it is desirable that the pressure drop in the scale trapping unit 5 be as small as possible, and thus a cylindrical shape, for example, is preferred. On the other hand, the size of the water heater 1 is limited, and it is desired that the water heater system be compact. Thus, the pipe diameters of the plumbing products such as pipes are limited. Thus, a diameter reduction process may need to be performed as necessary to reduce the pipe diameters of the inlet pipe (scale trapping unit inlet pipe 11 in Embodiment 1) and outlet pipe (scale trapping unit outlet pipe 12 in Embodiment 1) of the scale trapping unit 5. In such a case, the shape of the scale trapping unit 5 close to the inlet pipe and the outlet pipe is preferably such a shape that provides excellent workability and is capable of inhibiting pressure drop or decrease as much as possible by having the pipe connected to the central portion, and a preferred shape, for example, is a frusto-conical shape. In addition, to reduce the pressure drop at the pipe connecting portions between the hot water circulation circuit B and the scale trapping unit 5, it is necessary to connect the scale trapping unit 5 to the hot water circulation circuit B in the direction of the water flow as shown in FIG. 2 (i.e., so that the water can flow through the scale trapping unit 5 substantially linearly). The water outlet region of the scale trapping unit 5 may preferably be connected in linear alignment with the water flow direction at the central portion of the bottom surface of the end, but to match with the installation space in the water heater system, for example, may be oriented horizontally to the bottom surface, and the outlet may not be located at the central portion of the bottom surface at the end.

The structure for holding the scale adsorbing element 8 may not necessarily be a container such as the scale adsorbing element container 7 as long as the scale adsorbing element 8 is prevented from flowing out to the hot water circulation circuit B. For example, a structure in which fixtures are attached to the inlet pipe and outlet pipe of the scale trapping unit 5 may be employed. The scale adsorbing element container 7 may be formed of a wire mesh, provided that the openings of the wire mesh are sufficiently larger than the scale particles. As described above, when a wire mesh having small mesh openings is used, the wire itself serves as a filter and the opening portions of the wire mesh may become clogged with scale particles, which may result in blockage of the scale trapping unit 5. When the scale adsorbing element 8 is prevented from flowing out to the hot water circulation circuit B, it is not necessary to provide the structure itself for holding the scale adsorbing element 8.

Figure 3:
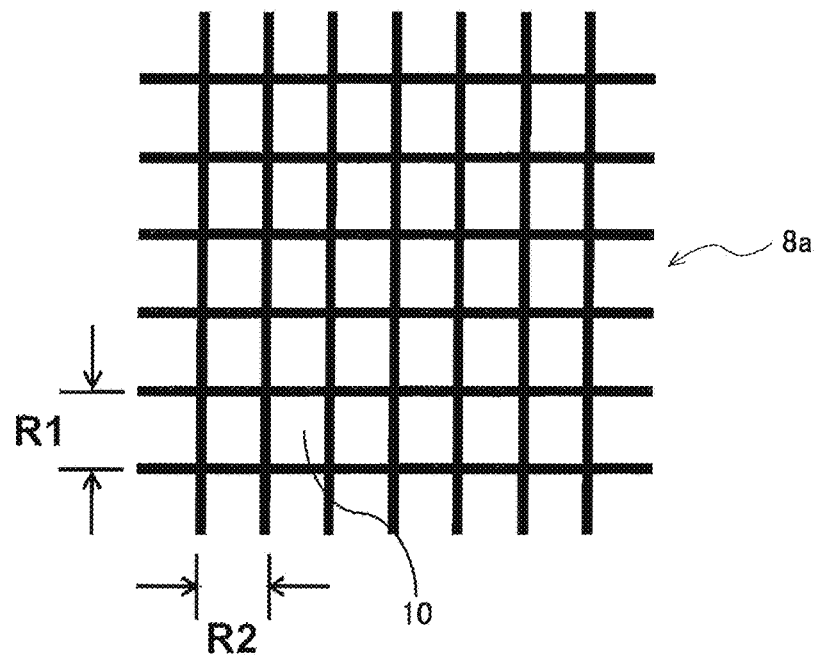
FIG. 3 is a diagram illustrating an exemplary constituent member for a scale adsorbing element according to Embodiment 1 of the present invention.
Figure 4:
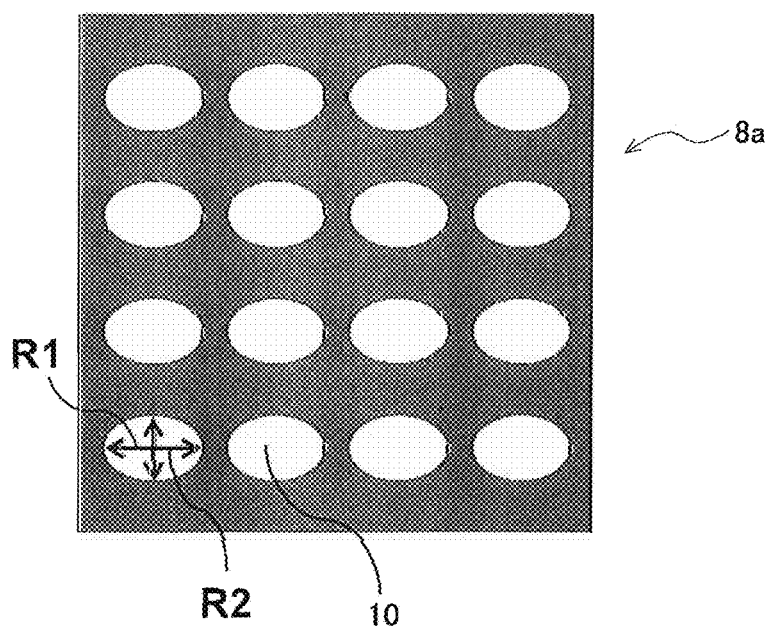
FIG. 4 is a diagram illustrating an exemplary constituent member for a scale adsorbing element according to Embodiment 1 of the present invention.

FIGS. 3 and 4 are diagrams each illustrating an exemplary constituent member for a scale adsorbing element according to Embodiment 1 of the present invention. The overall structure of the scale adsorbing element 8 that is loaded in the scale adsorbing element container 7 is constituted by, for example, a plurality of (10 or more in Embodiment 1) plate-shaped members that are stacked in the water flow direction in the scale trapping unit 5 (such as a vertical direction in the case of the scale trapping unit 5 in FIG. 2), with examples of the plate-shaped members including meshed plate-shaped members with the mesh openings thereof serving as opening ports 10 as shown in FIG. 3 and plate-shaped members having a plurality of opening ports 10 as shown in FIG. 4 (hereinafter the member that constitutes the scale adsorbing element 8 is referred to as a constituent structure 8a). A variation of this constituent member may be a stack of such plate-shaped members that are twisted or bent. The stack of the constituent structures 8a is preferably so that, for the purpose of increasing the probability of collision between the scale particles in the hot water and the constituent structures 8a, ten or more of the constituent structures 8a are stacked and their opening ports 10 are not aligned in the same lines with respect to the hot water flow direction. For example, ten or more of the constituent structures 8a are preferably stacked so that the opening ports 10 are alternately or irregularly spaced.

When the constituent structures 8a as shown in FIG. 4 are stacked, it is preferred that the constituent structures 8a to be stacked together be spaced from each other with at least a predetermined spacing (for example, 0.1 mm) therebetween so that opening ports 10 of any layer are prevented from lying on non-opened portions of layers to be stacked below and above the layer. Examples of methods to provide the spacing include inserting a spacer of at least a predetermined thickness (for example, 0.1 mm) between the constituent structures 8a shown in FIG. 4, and inserting a constituent structure 8a as shown in FIG. 3 between the constituent structures 8a shown in FIG. 4. As described later, some scale particles may have a diameter greater than the spacing between the constituent structures 8a. However, such scale particles will not be caught between the constituent structures 8a. Since the constituent structures 8a are stacked in the water flow direction, scale particles can flow through opening ports 10 faced in the water flow direction (opening ports that are larger than the scale particles).

Details of the constituent structures 8a and the opening ports 10 are described. As shown in FIGS. 3 and 4, the constituent structure 8a of the scale adsorbing element 8 is in the form of a flat plate having a plurality of meshed or circular openings (opening ports 10), and those having a high aperture ratio may be used. The shape of the opening port 10 is not limited, and any shapes other than those described above, such as triangular, rectangular, polygonal, and star-shaped may be employed as long as a high aperture ratio can be provided More specifically, the opening port 10 according to Embodiment 1 is configured so that the representative length Ld of the opening port 10 is within a range of 1 mm to 20 mm. As described below, scale particles seldom grow to a diameter of 1 mm and thus, by specifying the representative length Ld of 1 mm or more, it is possible to prevent the scale adsorbing element from being physically blocked by scales. The reason for specifying the upper limit of 20 mm for the representative length Ld is that, when the opening ports 10 are too large, the load volume of the scale adsorbing element 8 is reduced and thus their ability to trap scales, which is the primary object of the scale adsorbing element 8, will be decreased. The representative length is defined as follows. For example, when the opening port 10 is perfectly round, the diameter of the opening port 10 is designated as the representative length Ld. When the opening port 10 is not perfectly round, the representative length Ld is defined by Ld=4S/P where S is the area of the opening port 10 and P is the outer periphery.

Figure 5:
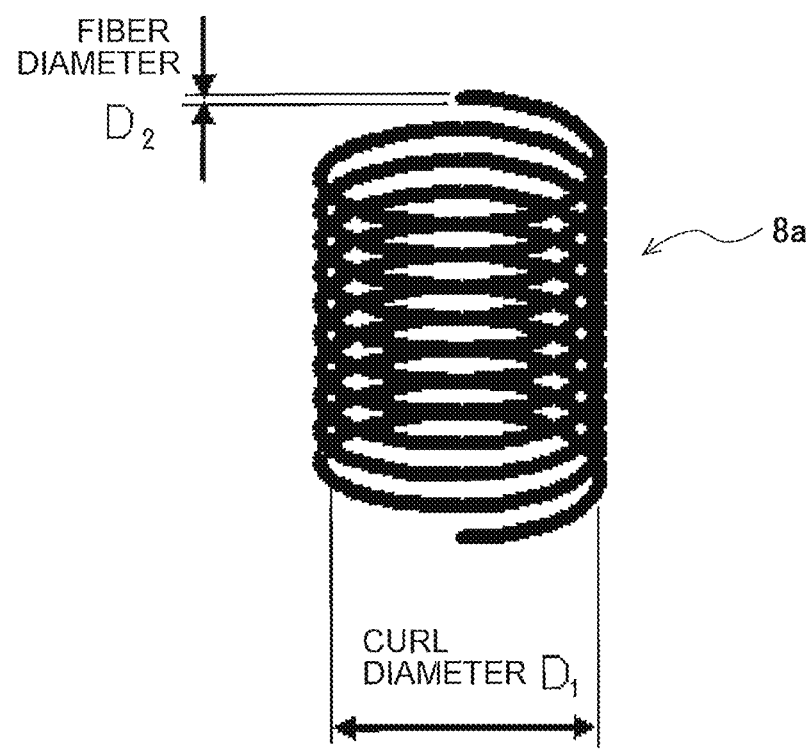
FIG. 5 is a diagram illustrating an exemplary constituent member for a scale adsorbing element according to Embodiment 1 of the present invention.

FIG. 5 is a diagram illustrating an exemplary constituent member for a scale adsorbing element according to Embodiment 1 of the present invention. As an alternative configuration of the constituent structure 8a of the scale adsorbing element 8, a helically wound fiber (curled fiber) as shown in FIG. 5 may also be employed, for example. When the shape of the cross section perpendicular to the direction of stacking (centerline of the winding) of the circularly wound fiber such as the constituent structure 8a of FIG. 5 is substantially perfectly round, the scale adsorbing element 8 formed by such curled fiber constituent structures 8a is defined by characteristic parameters including a curl diameter D (inside diameter of the opening port) corresponding to the representative length Ld of the opening port in cross section, a fiber diameter $D_2$ of the curled fiber, the outside diameter of the constituent structure 8a (and the outside diameter of the aggregate of the constituent structures 8a), and the height of the constituent structures 8a. When the above cross-sectional shape of the constituent structure 8a is not perfectly round, the representative length Ld is defined by Ld=4T/Q where T is the area of the opening port in cross section and Q is the outer periphery.

Figure 6:
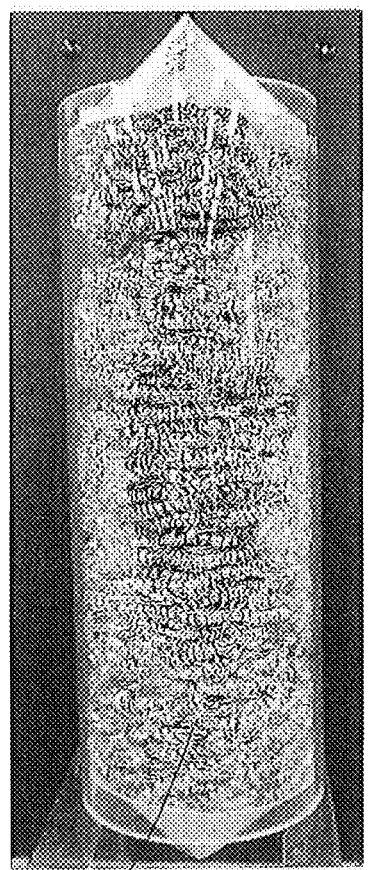
FIG. 6 illustrates a scale trapping unit 5 loaded with the constituent structures shown in FIG. 5.

The curl diameter $D_1$ is defined by the inside dimension of the fiber. Thus, the smaller the curl diameter $D_1$ is, the smaller the representative length Ld of the opening port is, resulting in a decreased porosity of the aggregate of the constituent structures 8a, i.e., the scale adsorbing element 8. In this case, the representative length Ld of the opening port in cross section (curl diameter $D_1$) is only required to be within the range of 1 mm to 20 mm. For practical purposes, the curled fiber preferably has a tensile strength of 2 to 4 kg. This condition corresponds to a corrosion resistance of 10 or more years in water heaters heating water to 60 degrees C. or more. The fiber diameter $D_2$ of the curled fiber can be 10 μm or more when the curled fiber is made of a stainless steel. FIG. 6 illustrates a scale trapping unit 5 loaded with a scale adsorbing element 8 made of curled fibers. The curled fibers can be produced by flatly compressing a predetermined stainless steel wire (such as SUS304) using a dedicated roller.

The scale adsorbing element 8 of Embodiment 1 is configured to trap scales not by physically screening scale particles similarly to a filter but by using adsorption force between the scale particles and the scale adsorbing element 8 to trap the scale particles on the surface of the scale adsorbing element 8 and also by causing crystallization of the scales on the surface of the scale adsorbing element 8 to trap the scale particles in water, the crystallization being caused by passing hot water through the scale adsorbing element 8 while maintaining the scale adsorbing element 8 at high temperature with the hot water. That is, the scale adsorbing element 8 of Embodiment 1 has the two functions, i.e., not only "adsorption" but also "crystallization", and as a result, is capable of trapping scale particles in water on the adsorbing element and thereby removing scale particles from the water. When nucleation of calcium carbonates occurs on the surface of a constituent material of the scale adsorbing element 8, the smaller the energy barrier is, the greater tendency the material is considered to have to cause nucleation (crystallization) on the surface of the scale adsorbing element 8.

Examples of the material of the scale adsorbing element 8 that may be used include copper, brass, stainless steel, a silicone rubber, glass, iron, oxidized iron (III, II), polytetrafluoroethylene (a Teflon (registered trademark) resin (PTFE, PFA)), polyvinyl chloride, polyethylene, polystyrene, polypropylene, polysulfone, an isoprene rubber, a butadiene rubber, a styrene-butadiene rubber, and aromatic-series polyamide (for example, nylon-6 or nylon-6-6). Among these materials, copper, brass, stainless steel, a silicone rubber, glass, iron, oxidized iron (III, II), polyvinyl chloride, polyethylene, polystyrene, polypropylene, polysulfone, an isoprene rubber, a butadiene rubber, or a styrene-butadiene rubber is more preferred. The material of the scale adsorbing element 8 is not limited to the above-mentioned materials, and other materials may be used as the material of the scale adsorbing element 8, provided that the energy necessary for nucleation of calcium carbonates is comparable. Preferred materials include a material with which the energy for nucleation of calcium carbonate scale particles on the surface is not more than $2.0 \times 10^{-20}$ (J).

The void region 9 has a function of inhibiting pressure drop increase due to trapped scale particles in the scale trapping unit 5 and preventing flow rate decrease and blockage in the hot water circulation circuit B of the water heater 1. Specifically, the scale trapping unit inlet pipe 11 is connected, in a direction perpendicular to the bottom surface at the end where the water inlet is located in the casing 5a, to the central portion of the bottom surface at the end where the inlet is located, to cause the water to flow through the scale trapping unit inlet pipe 11, the void region 9, and the scale adsorbing element 8 in a constant direction. The void region 9 is configured so that the space expands along the overall outer periphery in a symmetrical manner. The water flow velocity is greatest at the central portion, decreases with decreasing distance to the outer peripheral portion, and reaches a minimum at the wall surface of the overall outer peripheral portion. In the void region 9, while scale particles deposit uniformly on the entire outer peripheral portion, deposit of scale particle is less likely to occur at the central portion, where the water flow velocity is greatest. Thus, the void region 9 has the function of ensuring the water flow path at the central portion and inhibiting pressure drop increase over a long period of time, thereby preventing flow rate decrease and blockage in the hot water circulation circuit B of the water heater 1. For example, when water flows into the void region 9 horizontally with respect to the bottom surface at the end where the water inlet is located in the casing 5a, the symmetrical feature of the water flow velocity will be lost and thus the above advantageous effects cannot be produced. Embodiment 1 has clearly shown the phenomenon that, in the scale trapping unit 5 for trapping scales with the scale adsorbing element 8 constituted by constituent structures 8a having opening ports greater than scale particles, pressure drop in the scale trapping unit 5 increases due to the trapped scales. The size of scale particles varies depending on the water quality, operating temperature (water heating temperature), operating time of the water heater 1, or another factor, but Embodiment 1 assumes that the particles have diameters not more than 1 mm. Typically, hot water heated by a water heater in a tank is used and replaced in a few days, and thus it is believed that the particles very rarely grow to a diameter of 1 mm or more.

Figure 7:
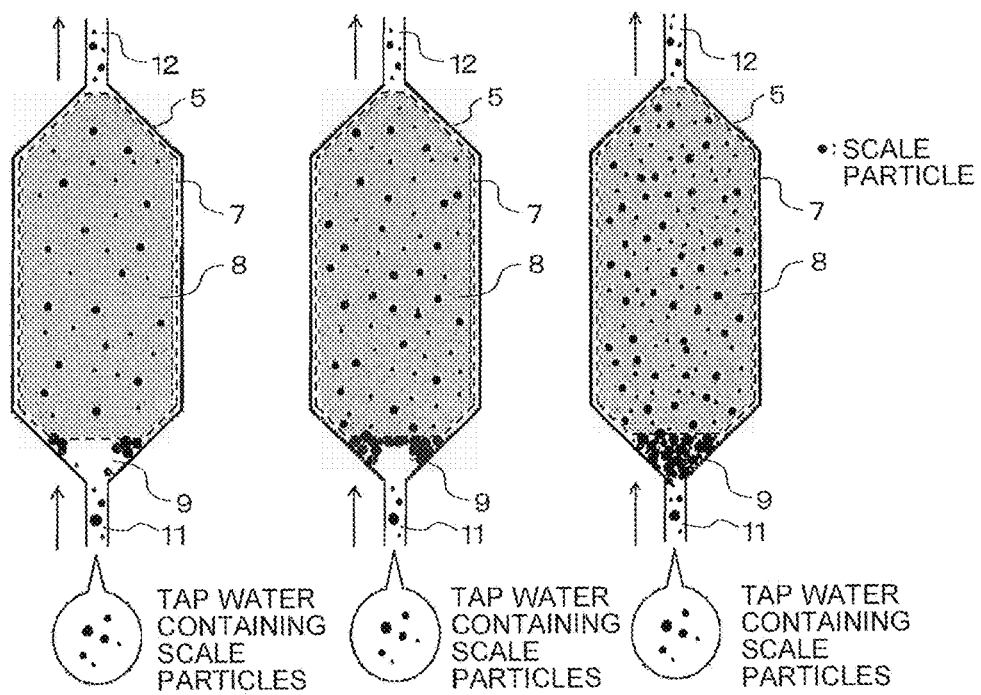
FIG. 7 is a conceptual drawing illustrating how scale particles are trapped by the scale trapping unit 5 according to Embodiment 1 of the present invention.

FIG. 7 is a conceptual drawing illustrating how scale particles are trapped by the scale trapping unit 5 according to Embodiment 1 of the present invention. It has been found that, in the scale trapping unit 5 of Embodiment 1, scale particles having a large particle diameter of several hundred μm or more are more likely to be trapped on the upstream side of the scale trapping unit 5. This is believed to be because scale particles having a larger particle diameter have greater van der Waals forces with the scale adsorbing element 8 and thus scale particles having a larger particle diameter tend to be trapped firstly on the upstream side. With reference to FIG. 7, how scale particles are trapped in the scale trapping unit 5 of Embodiment 1 will be described.

When the operation of the water heater 1 starts and the hot water in the hot water circulation circuit B starts to flow through the scale trapping unit 5, scale particles having particle diameters that allow them to be firstly trapped on the upstream side of the scale adsorbing element 8 gradually deposit on the upstream side of the scale adsorbing element 8, i.e., in the void region 9, as shown in the left drawing in FIG. 7. Specifically, the deposit begins uniformly at the outer peripheral portion where the flow velocity is lowest. Then, as shown in the middle drawing of FIG. 7, a porous scale deposit layer begins to form in the void region 9. The scale deposit layer is porous and a sufficiently large portion of the void region 9 still remains, and thus scales deposit so that pressure drop in the scale trapping unit 5 can be as small as possible. Scales trapped in the void region 9 themselves have the function of adsorbing scales formed in water.

The porous scale deposit layer grows so that pressure drop increase can be minimized in the void region 9. However, when the porous scale deposit layer has been formed over the entire void region 9, no more areas remain to allow scales to deposit as a porous layer, and thus thereafter, scales are trapped to densify the porous layer, as shown in the right drawing of FIG. 7, which leads to pressure drop increase in the scale trapping unit 5 and results in flow rate decrease and blockage in the hot water circulation circuit B of the water heater 1. That is, it has been found that providing a large void region 9 can dramatically extend the period of time before the pressure drop in the scale trapping unit 5 increases and the flow rate through the hot water circulation circuit B in the water heater 1 decreases.

This phenomenon is demonstrated herein for the first time as it was less predictable within the range of conventional technologies. When physical screening of scale particles, for example, with a filter, is employed to trap scales, clogging occurs in the surface of the filter, resulting in blockage in the flow path. When a trapping member such as a filter is used, the period of time before blockage cannot be extended even when a void region is provided in an upstream portion. Thus, optimal configuration of the void region was not contemplated in conventional technologies. Further, when the inlet structure of a scale trapping unit is configured without considering the function of the void region sufficiently, it is impossible to take advantage of the void region adequately.

Possible methods to enlarge the void region 9 include increasing the size of the scale trapping unit 5 itself, and reducing the amount of the scale adsorbing element 8 to increase the void region 9. The former is limited by the size of the housing in which the scale trapping unit 5 is accommodated (for example, an outdoor unit in which the heat source 2, the heat exchanger 4, and the scale trapping unit 5 are accommodated), but enlargement of the size of the scale trapping unit 5 within the limitation is effective. The latter optimizes the configuration in the scale trapping unit 5 to inhibit pressure drop increase and blockage due to scale deposit in the upstream portion of the scale trapping unit while maintaining high scale trapping performance, and thus it is possible to provide the water heater 1 that is capable of operating with high performance for an extended period of time without maintenance. In Embodiment 1, "maintenance free" refers to no necessity for cleaning and replacement of the parts of the scale trapping unit 5 and the heat exchanger 4 over a period of 10 or more years, and preferably 15 or more years.

When the void region 9 is enlarged excessively, the volume of the scale adsorbing element 8 is reduced and thus the scale trapping ability of the scale trapping unit 5 decreases. On the contrary, when the void region 9 is not sufficiently large, blockage occurs in the scale trapping unit 5 with its scale trapping ability being still sufficient, and consequently the operation of the water heater 1 will be disabled. Thus, as described later in Embodiment 3, the volume ratio X/Y between the volume X of the void region 9 and the volume Y of the region of the scale adsorbing element 8 is preferably within a range of 0.005 to 1.5.

That the void region 9 may be provided in both areas upstream and downstream of the scale adsorbing element 8 (at both ends of the casing 5a) to easily perceive upstream and downstream in the manufacturing or installing step without misunderstanding.

Next, the manner of operation of the water heater 1 is described. As shown in FIG. 1, firstly, tap water is introduced into the hot water storage tank 3 from the water supply pipe 13 and, when the hot water storage tank 3 becomes full of the water, the heat source 2 is actuated to circulate a high temperature heat medium in the circulation pipe 14. Concurrently, the circulation pump 6 is actuated to supply water in the hot water storage tank 3 to the heat exchanger 4 through the heat exchanger inlet pipe 15, to heat the water by heat exchange with the heat medium. The hot water heated in the heat exchanger 4 is supplied to the scale trapping unit 5 through the scale trapping unit inlet pipe 11 and, after contacting the scale adsorbing element 8 in the scale trapping unit 5, returns to the hot water storage tank 3 through the scale trapping unit outlet pipe 12. Circulation of the heat medium and the hot water in the hot water storage tank 3 is continued until the temperature of the water in the hot water storage tank 3 reaches a predetermined temperature and, after completion of heating, the hot water in the hot water storage tank 3 is supplied as necessary through the hot water supply pipe 16 to be used as warm water. Between the heat source 2 and the heat exchanger 4, an intermediate circuit for circulating warm water may be provided, and further a circuit that allows application to indoor heating such as floor heating may be provided in combination.

As described above, in the water heater 1 of Embodiment 1, the scale trapping unit 5 is provided with the scale adsorbing element 8 having specified, sufficiently large opening ports 10 and the void region 9 located in a portion upstream of the scale adsorbing element 8. This configuration makes it possible to inhibit pressure drop increase in the scale trapping unit 5 due to densification of the scale particle deposit layer and the resulting flow rate decrease and blockage in the hot water circulation circuit B of the water heater 1 as well as to inhibit deposition of scale particles onto the heat exchanger 4 for an extended period of time. Consequently, the water heater 1 is capable of operating with high performance for an extended period of time without maintenance. Furthermore, the scale trapping unit 5 of Embodiment 1 is of simple configuration as described above, and thus can provide the advantages of low cost production and easier maintenance.

Embodiment 2

The void region of the scale trapping unit 5 shown in Embodiment 1 may be configured as follows. Parts not described in Embodiment 2 are similar to those in Embodiment 1, and parts similar to those in Embodiment 1 are assigned the same reference signs as in Embodiment 1.

Figure 8:
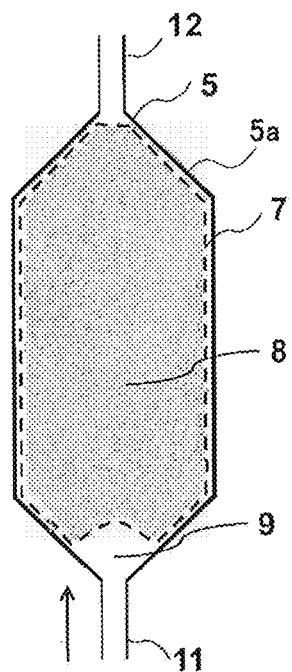
FIG. 8 is a cross-sectional view of the scale trapping unit 5 according to Embodiment 2 of the present invention.

FIG. 8 is a cross-sectional view of the scale trapping unit 5 according to Embodiment 2 of the present invention. The configuration is similar to that of Embodiment 1 described above except that the forms of the scale adsorbing element 8 (i.e., scale adsorbing element container 7) and the void region 9 in the scale trapping unit 5 are different. The configuration, materials, manner of loading, and other features of the constituent structures 8a, which constitute the scale adsorbing element 8, are also similar to those in Embodiment 1.

The scale adsorbing element 8 of the scale trapping unit 5 of Embodiment 2 is configured so that the end where the water inlet is located has a recessed shape that is recessed toward the central portion of the scale adsorbing element 8, the central portion being downstream of the end. This recessed shape is a shape that narrows toward the downstream. With this configuration, densification of the scale particle deposit layer close to the scale trapping unit inlet pipe 11 can be mitigated even when the volume of the void region 9 is the same, and thus it is possible to further inhibit the pressure drop increase in the scale trapping unit 5 and the resulting flow rate decrease and blockage in the hot water circulation circuit B of the water heater 1. It is noted that the shape of the scale adsorbing element 8 (i.e., scale adsorbing element container 7) may be so that the upstream portion and downstream portion of the scale adsorbing element 8 are symmetrical to each other to easily perceive upstream and downstream in the manufacturing or installing step without misunderstanding. That is, both end portions of the scale adsorbing element 8 may be each formed to have a recessed shape that is recessed toward the central portion of the scale adsorbing element 8. Further, the void region 9 may also be formed in the downstream end portion of the scale trapping unit 5. To avoid a decrease in the load volume of the scale adsorbing element 8, the scale adsorbing element 8 may be formed to have a convex shape at the end where the water outlet is located, the convex shape projecting downstream thereof, toward the end where the water outlet is located in the casing 5a (see FIG. 8).

Embodiment 3

Embodiment 3 is to show the design principles of a hollow portion diameter D3 and hollow portion length L (length of the cylindrical portion of the casing 5a, see FIG. 2) of the scale trapping unit 5 of the water heater 1. To ensure that the hot water circulation circuit B has a certain level or more of flow rate, it is necessary to maintain the pressure drop in the scale trapping unit 5 to be at or below a preset value. In this case, the shape and volume of the scale trapping unit 5 define the lower limit of the hollow portion diameter D3 and the upper limit of the hollow portion length L. By configuring the hollow portion diameter D3 and the hollow portion length L so that the pressure drop of the scale trapping unit 5 itself can be reduced even when the volume of the scale trapping unit 5 is the same, it is possible to ensure a certain level or more of flow rate for a more extended period of time even when scale deposit causes pressure drop increase. The scale trapping unit 5 is configured similarly to those of Embodiment 1 and Embodiment 2 described above except that the hollow portion diameter D3 and the hollow portion length L are varied.

EXAMPLE

Example 1

Example 1 relates to an experiment regarding the effect of preventing scale-induced blockage in the scale trapping unit 5 and the effect of preventing deposition of scales formed on the heat transfer surface in the heat exchanger 4 with respect to the volume ratio X/Y between the volume X of the void region 9 and the volume Y of the region of the scale adsorbing element 8, in the case of using the water heater 1 of Embodiment 1 shown in FIG. 1.

The experiment was conducted in the following manner. Firstly, 200 L of water at a temperature of 20 degrees C. having a hardness of 350 mg/L and a pH of 8.0 was stored in the hot water storage tank 3, and the water in the hot water storage tank 3 was circulated through a plate-type water-water heat exchanger to be heated. The heat transfer area of the heat exchanger 4 was 0.9 m². The heated high temperature water was circulated through the heat medium circulation circuit A of the heat exchanger 4 and the water was circulated through the hot water circulation circuit B of the heat exchanger 4 at a flow rate of 20 L/minute, so that the water in the hot water storage tank 3 was heated to 60 degrees C. in about an hour. The circulation rate corresponds to 6 (=20 L/minute×60 minutes/200 L), where the circulation rate is defined as the volume of water circulated within the time period of heating relative to the volume of the hot water storage tank 3.

The scale trapping unit 5 used was in a cylindrical shape with an inside diameter of 80 mm and a length of 200 mm (with both ends being reduced in diameter as described below). Curled fibers made of stainless steel were loaded therein as the scale adsorbing element 8. The curl diameter $D_1$ was 5.0 mm and the fiber diameter $D_2$ of the fiber cross section was 0.17 mm. The porosity of the scale adsorbing element 8 was 97.7%. A mesh having a mesh opening of 2 mm was used for the scale adsorbing element container 7, in which the upstream end had a flat shape generally perpendicular to the water flow direction. Under these conditions, with the volume ratio X/Y varied from 0 to 4, comparisons were made regarding the number of years before blockage of the scale trapping unit 5 and the number of years during which the effect produced by the scale trapping unit 5 of inhibiting scale deposition onto the heat exchanger 4 was maintained.

Figure 9:
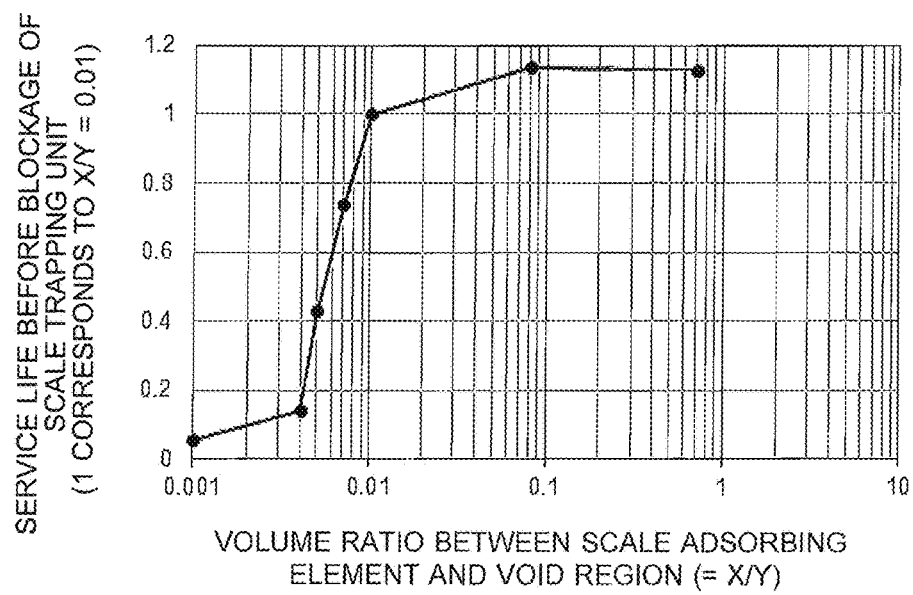
FIG. 9 is a graph showing results of an experiment in Example 1 of the present invention, in which are shown relative values of the numbers of years before blockage of the scale trapping unit 5 to a volume ratio X/Y between the volume X of a void region 9 and the volume Y of the region of a scale adsorbing element 8.

FIG. 9 is a graph showing results of an experiment in Example 1 of the present invention, in which are shown relative values of the numbers of years before blockage of the scale trapping unit 5 to a volume ratio X/Y between the volume X of a void region 9 and the volume Y of the region of the scale adsorbing element 8. In FIG. 9, the values on the horizontal axis are X/Y values and the values on the vertical axis are relative values of the service lives with the value corresponding to X/Y=0.01 assumed to be 1. The number of years before blockage of the scale trapping unit 5 refers to the number of years before the amount of pressure drop increase in the scale trapping unit 5 resulting from scale adsorption reaches 20 kPa. In this experiment, the scale trapping unit inlet pipe 11 had an inside diameter of 20 mm with a portion over a length of 25 mm being gradually reduced in diameter. When the volume ratio X/Y was 0.005 or more, the number of years in service before blockage of the scale trapping unit 5 increased significantly.

Figure 10:
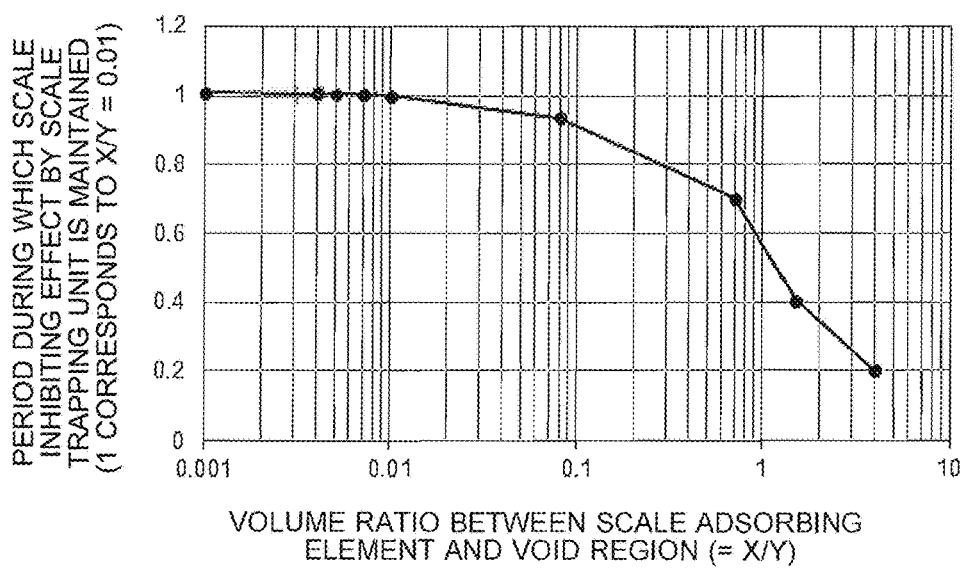
FIG. 10 is a graph showing results of the experiment of Example 1 of the present invention, in which are shown relative values of the numbers of years during which the effect produced by the scale trapping unit 5 of inhibiting scale deposition onto a heat exchanger 4 was maintained to the volume ratio X/Y between the volume X of the void region 9 and the volume Y of the region of the scale adsorbing element 8.

FIG. 10 is a graph showing results of the experiment of Example 1 of the present invention, in which are shown relative values of the numbers of years during which the effect produced by the scale trapping unit 5 of inhibiting scale deposition onto a heat exchanger 4 was maintained to the volume ratio X/Y between the volume X of the void region 9 and the volume Y of the region of the scale adsorbing element 8. In FIG. 10, the values on the horizontal axis are X/Y values and the values on the vertical axis are relative values of the service lives with the value corresponding to X/Y=0.01 assumed to be 1. The number of years during which the effect produced by the scale trapping unit 5 of inhibiting scale deposition onto the heat exchanger 4 was maintained refers to the number of years during which the COP of the water heater 1 can be maintained to be 85% or more of the initial value. In this experiment, a void region measuring 80 mm in diameter and 100 mm in length, aside from the 200 mm length of the scale trapping unit 5, was provided upstream of the scale adsorbing element 8 to prevent the scale trapping unit 5 from being blocked by trapped scales and becoming non-evaluable. It was found that, as the volume ratio X/Y increases, i.e., the load volume of the scale adsorbing element 8 decreases, the scale trapping ability of the scale trapping unit 5 decreases and thus the capability to inhibit scale deposition onto the heat exchanger 4 is reduced.

Figure 11:
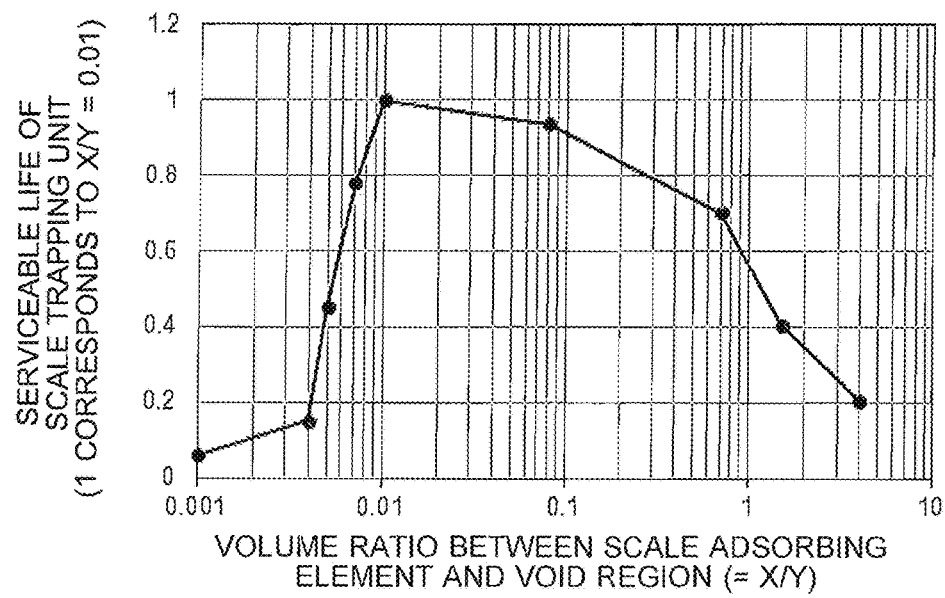
FIG. 11 is a graph showing results of the experiment in Example 1 of the present invention, in which are shown relative values of the numbers of years during which the scale trapping unit 5 was serviceable to the volume ratio X/Y between the volume X of the void region 9 and the volume Y of the region of the scale adsorbing element 8.

FIG. 11 is a graph showing results of the experiment in Example 1 of the present invention, in which are shown relative values of the numbers of years during which the scale trapping unit 5 was serviceable to the volume ratio X/Y between the volume X of the void region 9 and the volume Y of the region of the scale adsorbing element 8. In FIG. 11, the values on the horizontal axis are X/Y values and the values on the vertical axis are relative values of the service lives with the value corresponding to X/Y=0.01 assumed to be 1. As can be seen from FIG. 11, when the volume ratio X/Y between the volume X of the void region 9 and the volume Y of the region of the scale adsorbing element 8 was 0.005 or more and 1.5 or less, the number of years during which the effect produced by the scale trapping unit 5 of inhibiting scales was maintained was greatly improved compared with a conventional example with an X/Y=0 in which no void was provided. FIG. 11 indicates that, when X/Y is 0 or more and 0.01 or less, the scale trapping unit 5 has decreased scale trapping ability and experiences scale clogging in the void region 9 before becoming unable to inhibit scale deposition onto the heat exchanger 4. It indicates that, when X/Y is 0.01 or more, although scale clogging does not occur in the void region 9, the scale trapping unit 5 has decreased scale trapping ability and consequently becomes unable to inhibit scale deposition onto the heat exchanger 4. It was found that, when X/Y is 0.005 or more and 1.5 or less, the scale trapping unit 5 is serviceable with its scale trapping ability maintained without causing a flow rate decrease through the hot water circulation circuit B due to scale clogging. When the temperature of the hot water to be heated by the water heater 1 is lower, the amount of scale precipitation will be reduced and thus the number of years during which the scale trapping unit 5 is serviceable further increases. (In FIG. 11, the polygonal line moves parallelly upward in the Y-axis direction. The trend is unchanged.) In practice, while typical water heaters require heating to not less than 40 degrees C., the scale trapping unit 5 of Embodiment 3 is of course usable at temperatures of not less than 40 degrees C. as described above.

Example 2

Example 2 relates to an experiment regarding the effect of preventing scale-induced blockage in the scale trapping unit 5, in the case of using the scale trapping unit 5 of Embodiment 2.

The experiment was conducted in the following manner. Firstly, 200 L of water at a temperature of 20 degrees C. having a hardness of 350 mg/L and a pH of 8.0 was stored in the hot water storage tank 3, and the water in the hot water storage tank 3 was circulated through a plate-type water-water heat exchanger to be heated. The heat transfer area of the heat exchanger was 0.9 m$^2$. The heated high temperature water was circulated through the heat medium circulation circuit A of the heat exchanger 4 and the water was circulated through the hot water circulation circuit B of the heat exchanger 4 at a flow rate of 20 L/minute, so that the water in the hot water storage tank 3 was heated to 60 degrees C. in about an hour. The circulation rate corresponds to 6 (=20 L/minute×60 minutes/200 L), where the circulation rate is defined as the volume of water circulated within the time period of heating relative to the volume of the hot water storage tank 3.

The scale trapping unit 5 used was in a cylindrical shape with an inside diameter of 80 mm and a length of 200 mm. The scale trapping unit inlet pipe 11 had an inside diameter of 20 mm with a portion over a length of 25 mm being gradually reduced in diameter. Curled fibers made of stainless steel were loaded therein as the scale adsorbing element 8. The curl diameter $D_1$ was 5.0 mm and the fiber diameter $D_2$ of the fiber cross section was 0.17 mm. The porosity of the scale adsorbing element 8 was 97.7%. The volume ratio X/Y between the volume X of the void region 9 and the volume Y of the region of the scale adsorbing element 8 was set to 0.007.

Comparative Example 2

In Comparative Example 2, a mesh having a mesh opening of 2 mm was used for the scale adsorbing element container 7 and, in the scale adsorbing element 8, the shape of the end where the water inlet is located is flat and generally perpendicular to the water flow direction (the shape shown in FIG. 2).

Example 2-1

In Example 2-1, a mesh having a mesh opening of 2 mm was used for the scale adsorbing element container 7. In the scale adsorbing element 8, as shown in FIG. 8, the shape of the end where the water inlet is located is a bowl shape recessed 40 mm toward the downstream side of the scale trapping unit 5 (FIG. 8).

Example 2-2

Figure 14:
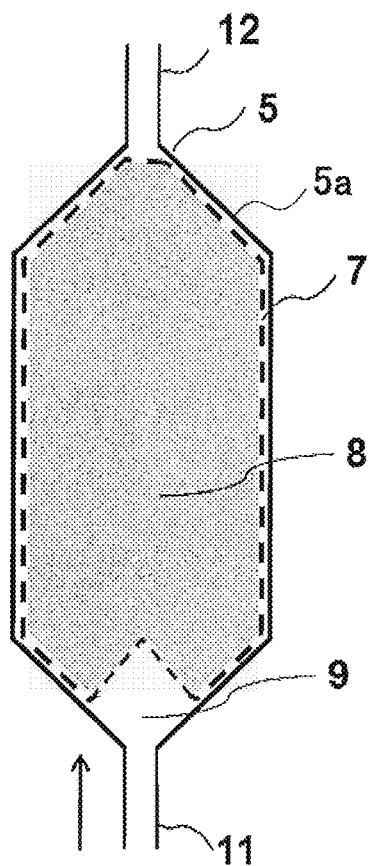
FIG. 14 is a cross-sectional view of a scale trapping unit according to Example 2-2.

In Example 2-2, a mesh having a mesh opening of 2 mm was used for the scale adsorbing element container 7. In the scale adsorbing element 8, the shape of the end where the water inlet is located is a cone shape recessed 40 mm toward the downstream side of the scale trapping unit 5 (see FIG. 14).

Figure 12:
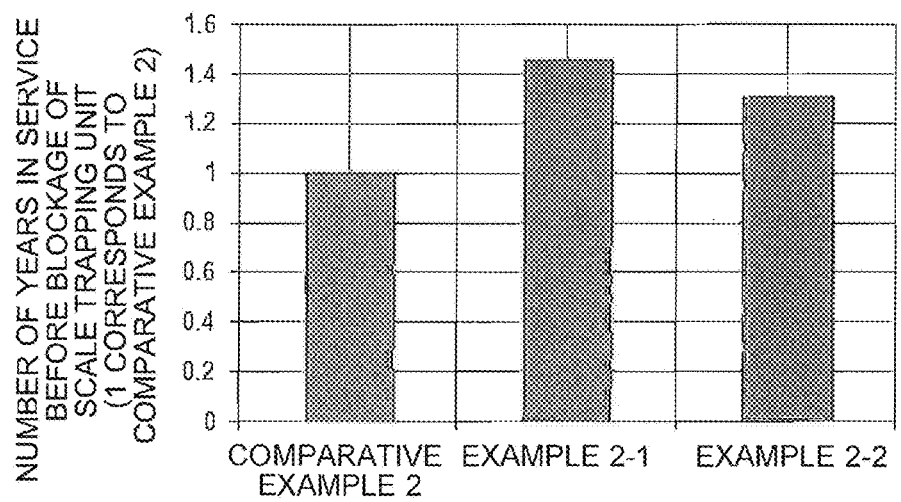
FIG. 12 is a graph showing results of an experiment in Example 2 of the present invention, in which are shown relative values of the numbers of years before the scale trapping unit 5 became blocked with scales.

FIG. 12 is a graph showing results of an experiment in Example 2 of the present invention, in which are shown relative values of the numbers of years before the scale trapping unit 5 became blocked with scales. It was found that the number of years before blockage increases when recessed shapes that are recessed toward the downstream are employed for the shape of the end where the water inlet is located in the scale adsorbing element 8. It is believed that, as a result of the shape of the end where the water inlet is located in the scale adsorbing element 8 being recessed toward the downstream, the area of the surface for the scale deposit layer resulting from scale deposit close to the inlet portion of the scale trapping unit 5 can be larger than in the case where the shape is flat with the volume of the void region 9 being the same, and thus the decrease in pressure drop was inhibited.

Example 3

Example 3 relates to studies regarding the change in pressure drop in the scale trapping unit 5 itself caused by the changes in the hollow portion diameter D3 and the hollow portion length L with the volume of the scale trapping unit 5 being 1 L. The scale trapping unit 5 was configured with various hollow portion diameters D3 and various hollow portion lengths L while the volume represented by D3×L was constant at 1 L. When the hollow portion diameter D3 is determined, the hollow portion length L is uniquely determined.

Figure 13:
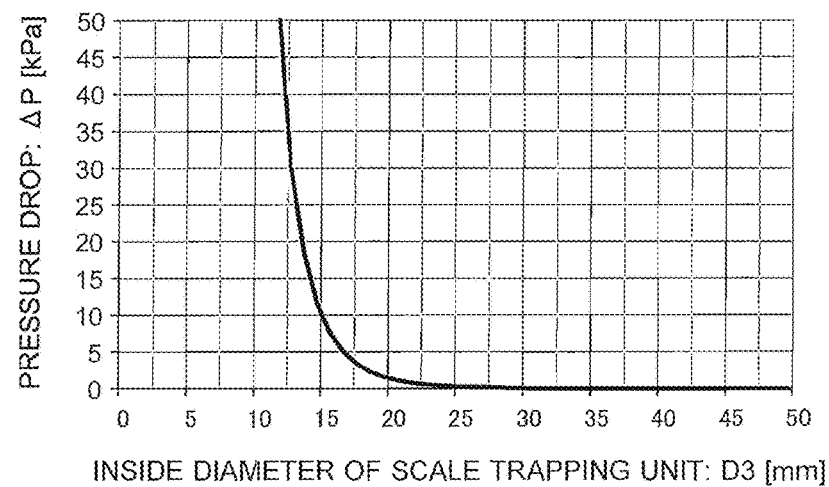
FIG. 13 is a graph showing results of an experiment in Example 3 of the present invention, in which is shown the change in pressure in the scale trapping unit 5 when a hollow portion diameter D3 of the scale trapping unit 5 changes.

FIG. 13 is a graph showing results of an experiment in Example 3 of the present invention, in which is shown the change in pressure in the scale trapping unit 5 when the hollow portion diameter D3 of the scale trapping unit 5 changes. To achieve the pressure drop of not more than 20 kPa in the scale trapping unit itself as in FIG. 13, D3 needs to be 14 mm or more (corresponding to the length L of 6.5 m or less). By configuring the hollow portion diameter D3 and the hollow portion length L so that the pressure drop in the scale trapping unit 5 itself can be further reduced even when the volume of the scale trapping unit 5 is the same, it is possible to ensure a certain level or more of flow rate for a more extended period of time even when scale deposit causes a pressure drop increase. In Embodiment 3, D3 is preferred to be 25 mm or more.

Embodiment 4

The structure for holding the scale adsorbing element 8 is not limited to the scale adsorbing element container 7 as described above. In Embodiment 4, an exemplary structure for holding the scale adsorbing element 8 is described. Parts not described in Embodiment 4 are similar to those in any of Embodiment 1 to Embodiment 3, and parts similar to those shown in any of Embodiment 1 to Embodiment 3 are assigned the same reference signs as in the above-mentioned embodiments.

Figure 15:
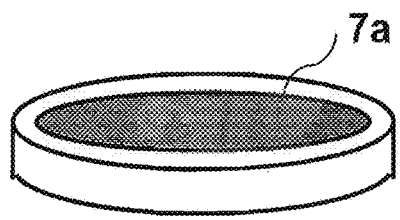
FIG. 15 is a perspective view of an exemplary strainer for a scale trapping unit according to Embodiment 4 of the present invention.
Figure 16:
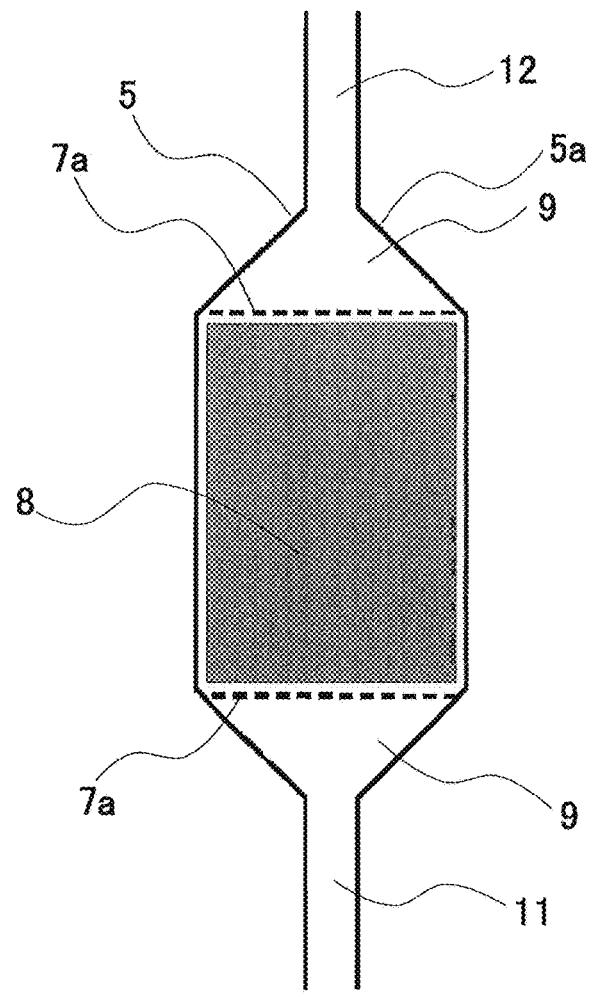
FIG. 16 is a cross-sectional view of an exemplary scale trapping unit according to Embodiment 4 of the present invention.

FIG. 15 is a perspective view of an exemplary strainer for a scale trapping unit according to Embodiment 4 of the present invention. FIG. 16 is a cross-sectional view of an exemplary scale trapping unit according to Embodiment 4 of the present invention. For example, when the shape of the end of the scale adsorbing element 8 is to be a flat shape generally perpendicular to the water flow direction as shown in Embodiment 1, a flat plate-shaped strainer 7a formed of a wire netting as shown in FIG. 15 may be used, for example. Specifically, as shown in FIG. 16, a strainer 7a shown in FIG. 15 may be secured to the end adjacent to which the void region 9 is desirably located in the scale adsorbing element 8 so that the scale adsorbing element 8 may be held by the strainer 7a and the casing 5a.

When the void regions 9 are to be formed at both ends of the scale adsorbing element 8 as shown in FIG. 16, a casing 5a having a diameter reduced portion only at one of its ends may be used and one of the strainers 7a may be attached to the diameter-reduced region to form one of the void regions 9, and thereafter, the scale adsorbing element 8 may be loaded in the casing 5a and the other strainer 7a may be attached to the inside of the casing 5a to form the other void region, and lastly, the other end may be subjected to diameter reduction. One method to secure the strainer is securing by swaging the side surface of the strainer and the casing. When the void region 9 is to be formed only at one of the ends of the scale adsorbing element 8, the scale adsorbing element 8 may be loaded after the strainer 7a is attached to the inside of the casing 5a, or after the scale adsorbing element 8 is loaded in the casing 5a, the strainer 7a may be attached.

Figure 17:
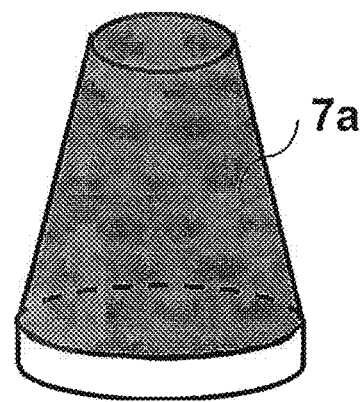
FIG. 17 is a perspective view of an exemplary strainer for a scale trapping unit according to Embodiment 4 of the present invention.
Figure 18:
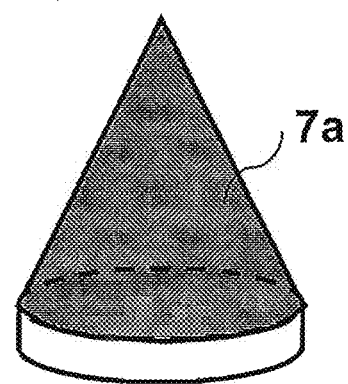
FIG. 18 is a perspective view of an exemplary strainer for a scale trapping unit according to Embodiment 4 of the present invention.
Figure 19:
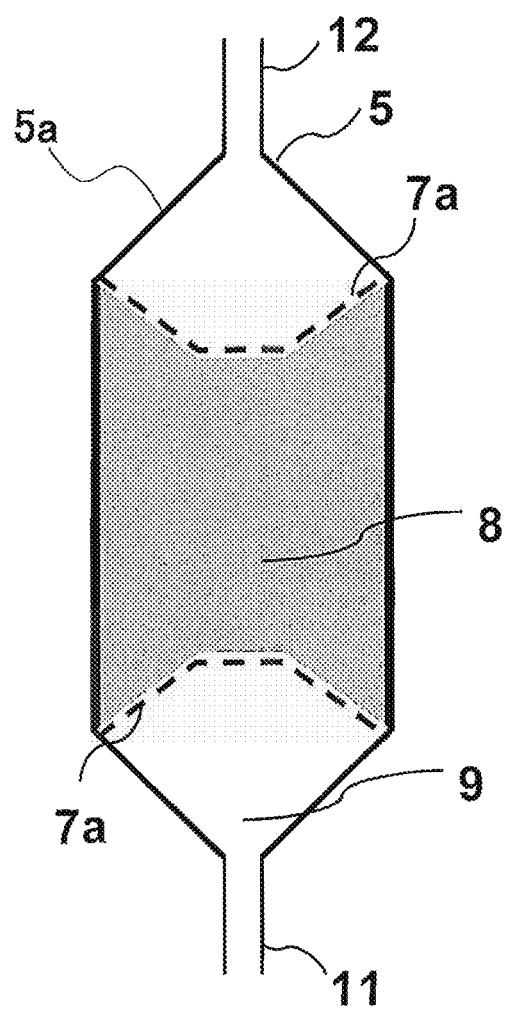
FIG. 19 is a cross-sectional view of an exemplary scale trapping unit according to Embodiment 4 of the present invention.

FIGS. 17 and 18 are perspective views of exemplary strainers for a scale trapping unit according to Embodiment 4 of the present invention. FIG. 19 is a cross-sectional view of an exemplary scale trapping unit according to Embodiment 4 of the present invention. For example, as shown in Embodiment 2, when the shape of the end of the scale adsorbing element 8 is to be a recessed shape that is recessed toward the central portion of the scale adsorbing element 8, which is located downstream of the end, the strainer 7a formed of a wire netting as shown in FIG. 17 or FIG. 18 may be used, for example. FIG. 17 and FIG. 18 both have a shape so that the diameter decreases toward the bottom of the recessed shape. For example, when the strainer 7a shown in FIG. 17 is employed, the strainer 7a shown in FIG. 17 may be placed at the end adjacent to which the void region 9 is desirably located in the scale adsorbing element 8 as shown in FIG. 19, so that the scale adsorbing element 8 may be held by the strainer 7a and the casing 5a.

When the void regions 9 are to be formed at both ends of the scale adsorbing element 8 as shown in FIG. 19, a casing 5a having a diameter reduced portion only at one of its ends may be used and one of the strainers 7a may be attached to the diameter-reduced region to form one of the void regions 9, and thereafter, the scale adsorbing element 8 may be loaded in the casing 5a and the other strainer 7a may be attached to the inside of the casing 5a to form the other void region, and lastly, the other end may be subjected to deformation to have the diameter reduced. One method to secure the strainer is securing by swaging the side surface of the strainer and the casing. When the void region 9 is to be formed only at one of the ends of the scale adsorbing element 8, the scale adsorbing element 8 may be loaded after the strainer 7a is attached to the inside of the casing 5a, or after the scale adsorbing element 8 is loaded in the casing 5a, the strainer 7a may be attached.

Embodiment 5

The ends of the scale trapping unit 5 are not limited to the frusto-conical, diameter-reducing tubular structure. In Embodiment 5, an exemplary structure of the scale trapping unit 5 is described. Parts not described in Embodiment 5 are similar to those in any of the Embodiment 1 to Embodiment 4, and parts similar to those shown in any of Embodiment 1 to Embodiment 4 are assigned the same reference signs as in the above-mentioned embodiments.

Figure 20:
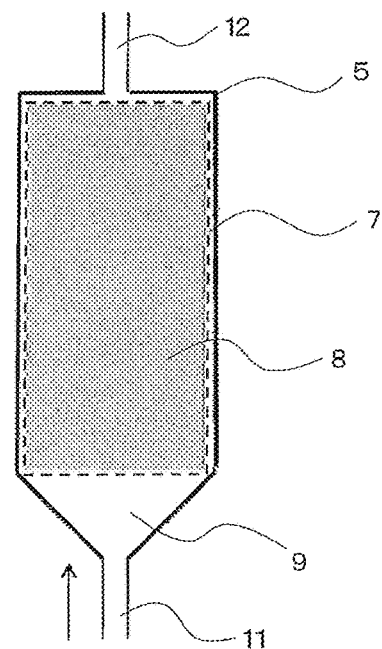
FIG. 20 is a cross-sectional view of an exemplary scale trapping unit according to Embodiment 5 of the present invention.

FIG. 20 is a cross-sectional view of an exemplary scale trapping unit according to Embodiment 5 of the present invention. The scale trapping unit 5 shown in FIG. 20 has a frusto-conical shape at the inlet portion and a cylindrical shape at the outlet portion. Even with this configuration of the scale trapping unit 5, the advantageous effects of the present invention can be produced as long as the scale trapping unit inlet pipe 11 is connected, in a direction perpendicular to the bottom surface at the end where the water inlet is located in the casing 5a, to the central portion of the bottom surface at the end where the inlet is located and thus the scale trapping unit inlet pipe 11, the void region 9, and the scale adsorbing element 8 are linearly aligned so that the water flows therethrough in a constant direction. In addition, the cylindrical shape at the outlet portion of the scale trapping unit 5 provides an advantage in that, the scale adsorbing element 8 has a larger volume with the height (length) of the scale trapping unit 5 being the same and thus the period of time before the scale trapping ability is decreased can be extended, in comparison with Embodiment 1, in which the outlet portion has a frusto-conical shape.

Figure 21:
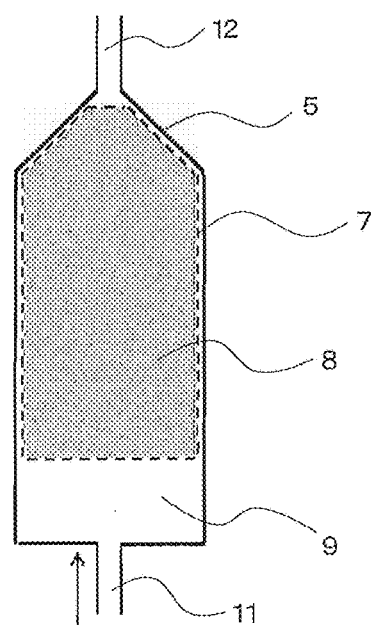
FIG. 21 is a cross-sectional view of an exemplary scale trapping unit according to Embodiment 5 of the present invention.

FIG. 21 is a cross-sectional view of an exemplary scale trapping unit according to Embodiment 5 of the present invention. The scale trapping unit 5 shown in FIG. 21 has a cylindrical shape at the inlet portion and a frusto-conical shape at the outlet portion. Even with this configuration of the scale trapping unit 5, the advantageous effects of the present invention can be produced as long as the scale trapping unit inlet pipe 11 is connected, in a direction perpendicular to the bottom surface at the end where the water inlet is located in the casing 5a, to the central portion of the bottom surface at the end where the inlet is located and thus the scale trapping unit inlet pipe 11, the void region 9, and the scale adsorbing element 8 are linearly aligned so that the water flows therethrough in a constant direction. In addition, the cylindrical shape at the inlet portion of the scale trapping unit 5 provides an advantage in that, the void region 9 has a larger volume with the height being the same and thus the period of time before scale clogging occurs can be extended, in comparison with Embodiment 1, in which the inlet portion has a frusto-conical shape.

Figure 22:
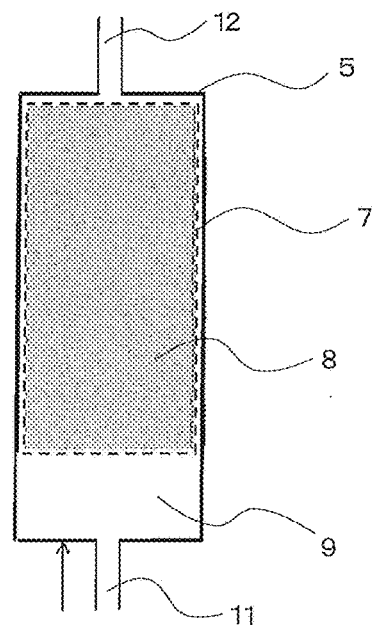
FIG. 22 is a cross-sectional view of an exemplary scale trapping unit according to Embodiment 5 of the present invention.

FIG. 22 is a cross-sectional view of an exemplary scale trapping unit according to Embodiment 5 of the present invention. The scale trapping unit 5 shown in FIG. 22 has a cylindrical shape at the inlet portion and at the outlet portion. Even with this configuration of the scale trapping unit 5, the advantageous effects of the present invention can be produced as long as the scale trapping unit inlet pipe 11 is connected, in a direction perpendicular to the bottom surface at the end where the water inlet is located in the casing 5a, to the central portion of the bottom surface at the end where the inlet is located and thus the scale trapping unit inlet pipe 11, the void region 9, and the scale adsorbing element 8 are linearly aligned so that the water flows therethrough in a constant direction. In addition, the cylindrical shape at the inlet portion of the scale trapping unit 5 is advantageous in that, the void region 9 has a larger volume with the height being the same and thus the period of time before scale clogging occurs can be extended, in comparison with Embodiment 1, in which the inlet portion has a frusto-conical shape. Furthermore, the cylindrical shape at the outlet portion of the scale trapping unit 5 provides an advantage in that, the scale adsorbing element 8 has a larger volume with the height of the scale trapping unit 5 being the same and thus the period of time before the scale trapping ability is decreased can be extended, in comparison with Embodiment 1, in which the outlet portion has a frusto-conical shape.

Figure 23:
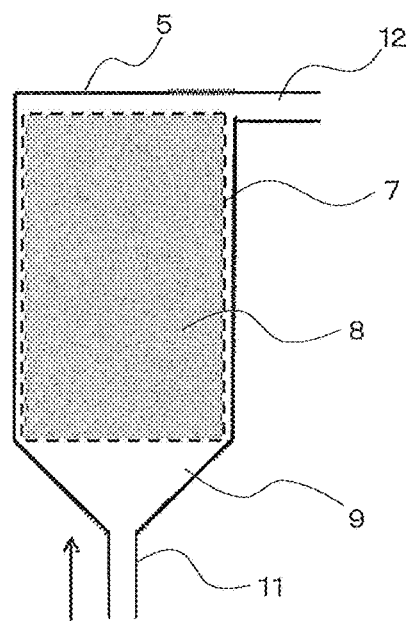
FIG. 23 is a cross-sectional view of an exemplary scale trapping unit according to Embodiment 5 of the present invention.

FIG. 23 is a cross-sectional view of an exemplary scale trapping unit according to Embodiment 5 of the present invention. The scale trapping unit 5 shown in FIG. 23 has a frusto-conical shape at the inlet portion and a cylindrical shape at the outlet portion. The scale trapping unit outlet pipe 12 is disposed horizontally with respect to the bottom surface at the end where the outlet is located in the scale trapping unit 5. Even with this configuration of the scale trapping unit 5, the advantageous effects of the present invention can be produced as long as the scale trapping unit inlet pipe 11 is connected, in a direction perpendicular to the bottom surface at the end where the water inlet is located in the casing 5a, to the central portion of the bottom surface at the end where the inlet is located and thus the scale trapping unit inlet pipe 11, the void region 9, and the scale adsorbing element 8 are linearly aligned so that the water flows therethrough in a constant direction. Furthermore, the perpendicular orientation of the scale trapping unit outlet pipe 12 with respect to the water flow direction provides an advantage in that, the height necessary for the placement of the scale trapping unit 5 is reduced and thus the necessary installation space can be reduced. When a sufficient space is available for installing the scale trapping unit 5, an advantage is provided in that the scale adsorbing element container 7 can be of a larger volume so that the volumes of the scale adsorbing element 8 and the void region 9 can be increased.

Figure 24:
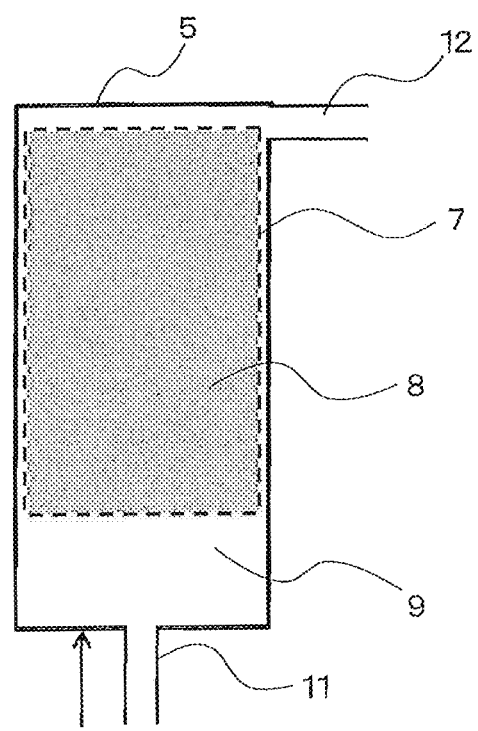
FIG. 24 is a cross-sectional view of an exemplary scale trapping unit according to Embodiment 5 of the present invention.

FIG. 24 is a cross-sectional view of an exemplary scale trapping unit according to Embodiment 5 of the present invention. The scale trapping unit 5 shown in FIG. 24 has a cylindrical shape at the inlet portion and at the outlet portion. The scale trapping unit outlet pipe 12 is disposed horizontally with respect to the bottom surface at the end where the outlet is located in the scale trapping unit 5. Even with this configuration of the scale trapping unit 5, the advantageous effects of the present invention can be produced as long as the scale trapping unit inlet pipe 11 is connected, in a direction perpendicular to the bottom surface at the end where the water inlet is located in the casing 5a, to the central portion of the bottom surface at the end where the inlet is located and thus the scale trapping unit inlet pipe 11, the void region 9, and the scale adsorbing element 8 are linearly aligned so that the water flows therethrough in a constant direction. In addition, the cylindrical shape at the inlet portion of the scale trapping unit 5 provides an advantage in that, the void region 9 has a larger volume with the height being the same and thus the period of time before scale clogging occurs can be extended, in comparison with Embodiment 1, in which the inlet portion has a frusto-conical shape. Furthermore, the perpendicular orientation of the scale trapping unit outlet pipe 12 with respect to the water flow direction provides an advantage in that, the height necessary for the placement of the scale trapping unit 5 is reduced and thus the necessary installation space can be reduced. When a sufficient space is available for installing the scale trapping unit 5, an advantage is provided in that the scale adsorbing element container 7 can be of a larger volume so that the volumes of the scale adsorbing element 8 and the void region 9 can be increased.

REFERENCE SIGNS LIST 1 water heater, 2 heat source, 3 hot water storage tank, 4 heat exchanger, 5 scale trapping unit, 5a casing, 6 circulation pump, 7 scale adsorbing element container, 7a strainer, 8 scale adsorbing element, 8a constituent structure, 9 void region, 10 opening port, 11 scale trapping unit inlet pipe, 12 scale trapping unit outlet pipe, 13 water supply pipe, 14 circulation pipe, 15 heat exchanger inlet pipe, 16 hot water supply pipe, A heat medium circulation circuit, B hot water circulation circuit.

The invention claimed is:
1. A scale trapping unit comprising:
   a casing having a water inlet and a water outlet at respective ends; and
   a scale adsorbing element loaded in the casing, the scale adsorbing element having opening ports, each of the opening ports having a representative length greater than a length of a scale particle,
   wherein the casing has a void region at least at the end where the water inlet is located,
   wherein an expression of $0.005 \leq X/Y \leq 1.5$ is satisfied, where X is a volume of the void region and Y is a volume of the scale adsorbing element.
2. The scale trapping unit of claim 1, wherein a water inlet pipe is perpendicularly connected to a central portion of a bottom surface at the end of the casing where the water inlet is located, the water inlet pipe being linearly aligned with the void region and the scale adsorbing element so that water flows therethrough in a constant direction.
3. The scale trapping unit of claim 1, wherein
   the scale adsorbing element is configured to have adsorption force to trap the scale particles, and
   when the scale particles are trapped onto the scale adsorbing element maintained at high temperature with hot water, the scale particles are crystallized on a surface of the scale adsorbing element.
4. The scale trapping unit of claim 1, wherein a central portion of an end of the scale adsorbing element located on a side of the water inlet has a recessed shape being recessed toward a central portion of an end of the scale adsorbing element located on a side of the water outlet.
5. The scale trapping unit of claim 1, wherein the void region is formed at each of the ends in the casing, and the central portions of the ends of the scale adsorbing element each has a recessed shape being recessed toward a corresponding one of the central portions of the scale adsorbing element.
6. The scale trapping unit of claim 1, wherein the representative length is within a range of 1 mm to 20 mm.
7. The scale trapping unit of claim 1, wherein an expression of $Ld=4S/P$ is satisfied, where Ld is the representative length, S is an area of the opening ports, and P is an outer peripheral length of the opening ports.

8. The scale trapping unit of claim 1, wherein the scale adsorbing element includes a stack of plate-shaped members, each of the plate-shaped members having the opening ports.

9. The scale trapping unit of claim 1, wherein the scale adsorbing element includes a helically wound fiber.

10. A water heater comprising:
- a hot water storage tank; and
- a heat exchanger heating water to be stored in the hot water storage tank, the hot water storage tank and the heat exchanger being connected to each other by pipes to form a hot water circulation circuit, wherein the scale trapping unit of claim 1 is provided at at least one location in the hot water circulation circuit.

\* \* \* \* \*